T. EDWARDS.
APPARATUS FOR PREPARING FOOD PRODUCTS.
APPLICATION FILED OCT. 13, 1910.
988,258.
Patented Mar. 28, 1911.
2 SHEETS—SHEET 1.
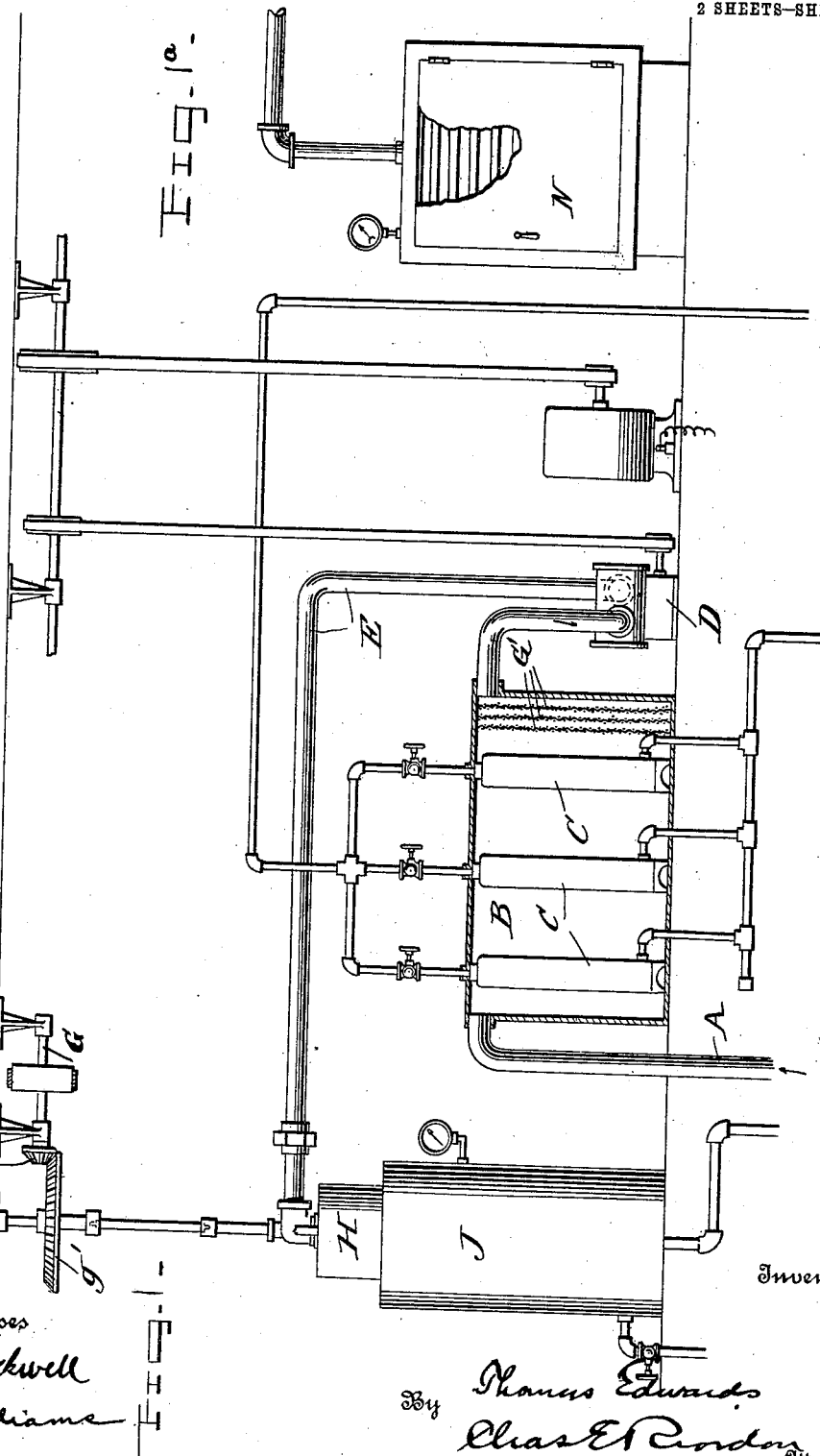

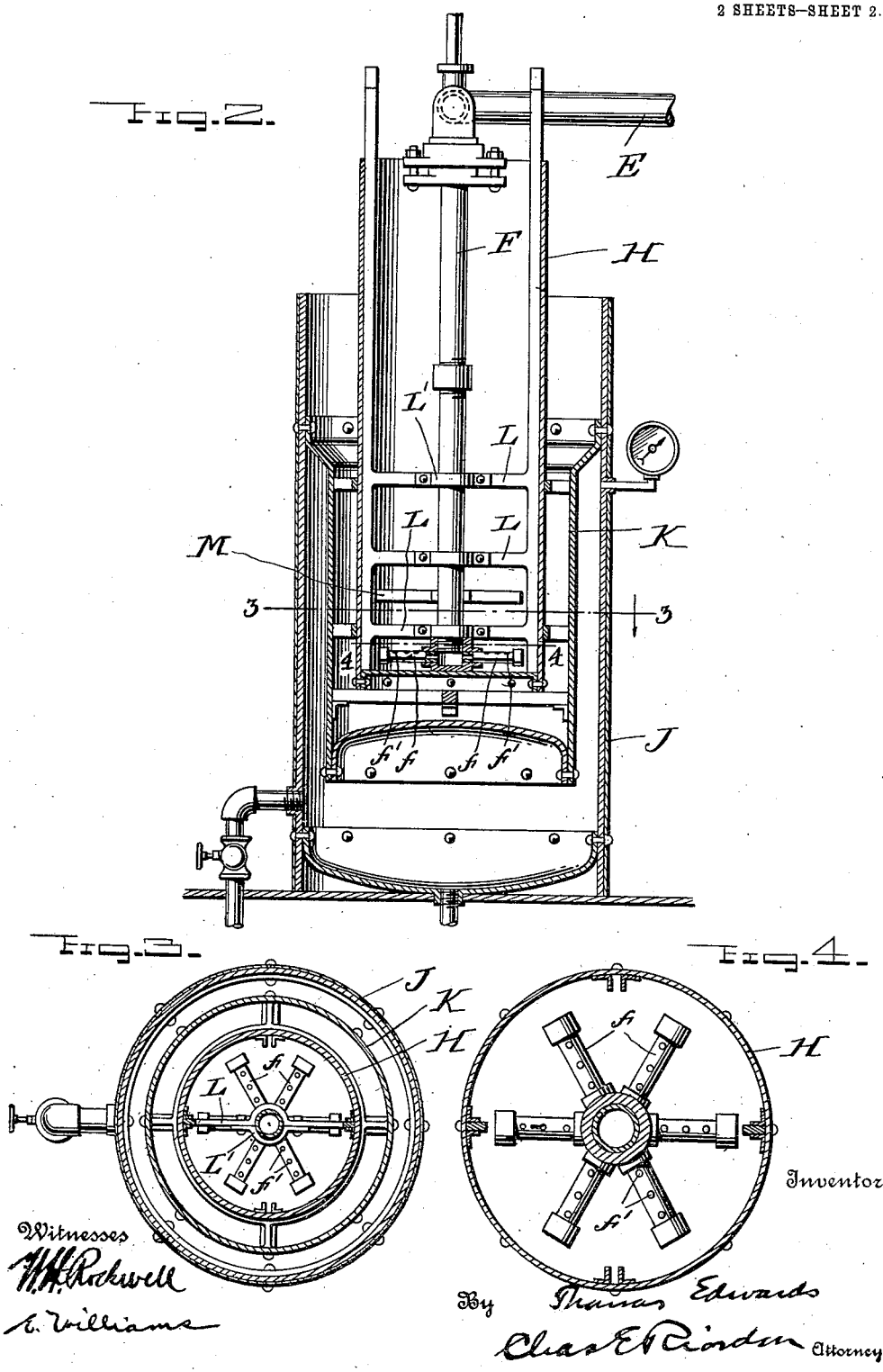

UNITED STATES PATENT OFFICE.

THOMAS EDWARDS, OF WASHINGTON, DISTRICT OF COLUMBIA.

APPARATUS FOR PREPARING FOOD PRODUCTS.

988,258.     Specification of Letters Patent.     Patented Mar. 28, 1911.

Application filed October 13, 1910. Serial No. 586,879.

*To all whom it may concern:*

Be it known that I, THOMAS EDWARDS, a citizen of the United States, residing at Washington, District of Columbia, have invented certain new and useful Improvements in Apparatus for Preparing Food Products, of which the following is a full, clear, and exact specification.

This invention relates to improvements in apparatus for preparing food products for preservation, such as oysters and other shell fish, meat, vegetables, &c., whereby the resulting product may be preserved for an indefinite period of time, such product retaining all the natural and nutritious properties of the food under treatment.

The main object of the invention is to carry into effect and perform the process of preparing food products as fully set forth, described, and claimed in my application for patent thereon filed concurrently herewith.

I have shown in the accompanying drawings a preferred form of apparatus wherein;—

Figure 1 illustrates diagrammatically an apparatus suitable for this purpose; Fig. 1ª illustrates one form of evaporator which may be used in connection with the apparatus; Fig. 2 is a sectional view of the receptacle for containing the material being treated; Fig. 3 is a sectional view on the line 3—3 of Fig. 2; and Fig. 4 is a sectional view on the line 4—4 of Fig. 2.

Referring to said drawings wherein similar letters of reference are used to indicate corresponding parts in each of the several views A indicates an air inlet pipe, which conveys air to the receptacle B, wherein the air is heated by means of radiators C or any other preferred form of heating arrangement.

D indicates a suction and forcing apparatus which draws the air from the outside through the heating receptacle B and at the same time forces the heated air through the pipe E which communicates with the down pipe F leading into the receptacle containing the food under treatment. For purpose of purifying the air drawn in through pipe A a series of screens G' are arranged in the end of the heating receptacle B through which the air must pass before reaching the material being treated.

The suction and forcing apparatus D is operated through any suitable belt and pulley connections. Mounted on the shaft G of the operating mechanism is a gear wheel $g$, in mesh with the gear wheel $g'$, by which the down pipe F is continuously revolved while the air is being forced through pipe F. At the lower end of pipe F radially extending arms $f$ are provided, said arms having a series of perforations $f'$ through which the air escapes into the mass of food being treated and out through the upper open end of the receptacle H.

J indicates a receptacle for the reception of hot water or steam for the purpose of heating the water placed in the inner receptacle K. The food receiving receptacle H is removably mounted in receptacle K and the mass contained therein is heated by means of the hot water or steam contained in receptacle K, at the same time that currents of air, preferably hot air, are being forced through the material under treatment.

For the purpose of thoroughly breaking up and separating the constituent elements of the mass I provide a series of cross arms L which are removably mounted in the food receiving receptacle H. These cross arms L are stationary or fixed and are formed with bearings L' in which the down pipe F freely rotates. In treating such food as oysters the mass at one stage assumes a gluey consistency and hence were the arms L, for instance, revoluble, the entire mass would be revolved and no disintegration or breaking up of the mass take place. These arms L with the uprights to which they are secured and form a part are, however, removable through the upper open end of the receptacle H. For the purpose of aiding in the breaking up of the constituent parts of the mass I provide the cross arm M rigidly connected to the down pipe F and hence revoluble therewith.

The operation of the apparatus will be readily understood from the foregoing description. The machinery having been set in operation by the shifting of proper levers the pipe F is thereby caused to rotate, at the same time that air is drawn in by the suction apparatus D and forced through the pipe E, F, and out at the perforations $f'$ up through the mass being treated, the mass of course having previously, after being ground, been placed in the receptacle H. The material under treatment has a tendency to rotate by the rotation of the perforated arms $f$, but such rotation is prevented by the mass coming in contact with the cross arms L and thereby being broken up or disintegrated. The mass is further separated by means of the cross arm M which, as above described, is rigidly secured to the pipe F, and revolves therewith.

As fully set forth in said copending application for the process, I utilize an evaporator, one form of which is shown at N in Fig. 1ª. This evaporator, however, forms no part of my present invention.

Having thus fully described my invention what I claim as new and desire to secure by Letters Patent is:—

1. In an apparatus of the character described, a receptacle for receiving the material to be treated, an air pipe revolubly mounted in said receptacle, stationary means arranged within said receptacle and extending across the interior thereof for disintegrating the material under treatment, by contact of the material against said stationary means and means for simultaneously revolving said pipe and forcing air therethrough into and through the material, substantially as described.

2. In an apparatus of the character described, a receptacle for receiving the material to be treated, an air pipe revolubly mounted in said receptacle, stationary means removably mounted in said receptacle and extending across the interior thereof for disintegrating the material under treatment by contact of the material against said stationary means, a cross arm secured to said pipe and revoluble therewith for disintegrating the material and means for simultaneously revolving said pipe and forcing air therethrough into and through the material.

3. In an apparatus of the character described, a receptacle for receiving the material to be treated, an air pipe revolubly mounted in said receptacle, stationary means removably mounted in said receptacle and extending across the interior thereof for disintegrating the material under treatment by contact of the material against said stationary means, a cross arm secured to said pipe and revoluble therewith for disintegrating the material, means for simultaneously revolving said pipe and forcing air therethrough into and through the material and means for heating the air prior to forcing the same through said pipe.

4. In an apparatus of the character described, a receptacle for receiving the material to be treated, an air pipe revolubly mounted in said receptacle, stationary means comprising uprights provided with cross arms forming bearings in which said air pipe revolves removably mounted in said receptacle for disintegrating the material under treatment, a cross arm secured to said pipe and revoluble therewith for disintegrating the material, means for simultaneously revolving said pipe and forcing air therethrough, and means for heating the air prior to forcing the same through said pipe.

5. In an apparatus of the character described, a receptacle for receiving the material to be treated, an air pipe revolubly mounted in said receptacle, stationary means arranged within said receptacle for disintegrating the material under treatment, by contact of the material against said stationary means, radially extending perforated arms secured to the inner end of said pipe, and means for simultaneously revolving said pipe and radially extending arms and forcing air through said perforations into and through said material, substantially as described.

6. In an apparatus of the character described a receptacle adapted to contain a heating medium, a water containing receptacle mounted in the first named receptacle, a receptacle for receiving the material to be treated removably mounted in said water receptacle, an air pipe revolubly mounted in said last named receptacle, stationary disintegrating means arranged in the material receiving receptacle adapted to disintegrate the material by contact of the material therewith, and means for simultaneously revolving said pipe and forcing air therethrough into and through the material being treated, substantially as described.

In testimony whereof I have signed my name to this specification in the presence of two subscribing witnesses.

THOMAS EDWARDS.

Witnesses:
  E. L. WILLIAMS,
  CHAS. E. RIORDAN.